Figure 1:
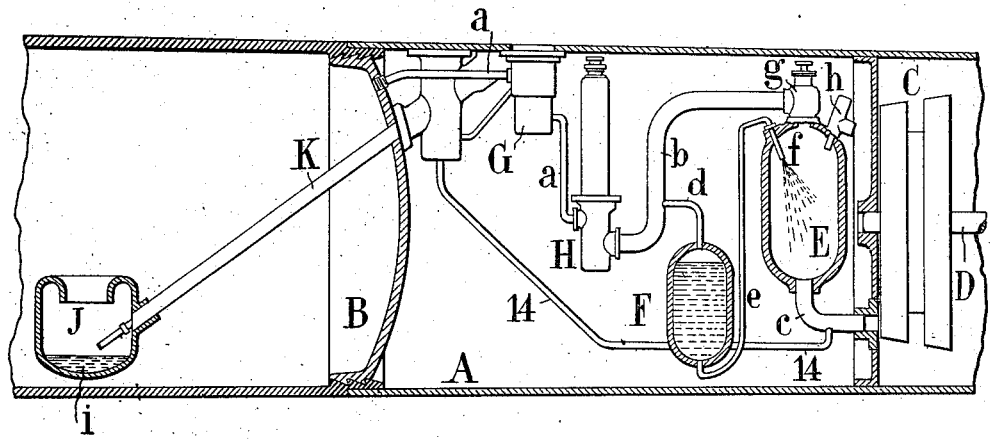

F. M. LEAVITT.
AIR HEATER FOR AUTOMOBILE TORPEDOES.
APPLICATION FILED JUNE 7, 1907.

950,550. Patented Mar. 1, 1910.

WITNESSES:

INVENTOR:
Frank M. Leavitt,
By Attorneys,

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

AIR-HEATER FOR AUTOMOBILE TORPEDOES.

950,550.  Specification of Letters Patent.  Patented Mar. 1, 1910.

Application filed June 7, 1907. Serial No. 377,706.

*To all whom it may concern:*

Be it known that I, FRANK M. LEAVITT, a citizen of the United States, residing in the borough of Brooklyn, county of Kings, city and State of New York, have invented certain new and useful Improvements in Air-Heaters for Automobile Torpedoes, of which the following is a specification.

This invention provides an improvement in means for heating the compressed air in an automobile torpedo in order to increase the energy which is imparted to the propelling engine and thereby impart to the torpedo either a greater speed or the ability to travel over a longer range.

Heretofore the air heater has been applied either within the compressed air reservoir, or exterior thereto and between the reducing valve and the engine. Each of these arrangements has its own advantages and disadvantages. My present invention provides means whereby I aim to secure the advantages of both methods without involving the disadvantages peculiar to either.

When the air is heated within the reservoir or flask the temperature imparted to the air is lowered upon the passage of the air through the reducing valve, so that the temperature is materially reduced before the air reaches the engine, and part of the added efficiency imparted by heating is lost. When the heater is placed beyond the reducing valve the air arrives at the engine with practically the same heat imparted to it in the heater, so that a greater amount of work may be obtained from a given weight of air. There is also the advantage that the hot gases do not pass through the torpedo valve system. But this external heating involves a serious loss, which is saved by placing the heater within the flask; namely, that the heat is not utilized to expel so much of the stored air toward the end of the run, so that with this system there remains a larger residue of compressed air unutilized after the run is over. This last condition may be best understood by considering a typical example. Assume that the air flask or reservoir when charged to full pressure (2250 pounds) will hold 191 pounds weight of air; and that the pressure is diminished by the reducing valve to 300 pounds per square inch as the working pressure delivered to the engine. Now when the pressure in the flask falls toward the end of the run to 300 pounds the run is practically over, because to continue it with a diminishing pressure and correspondingly diminishing speed would be impractical. Where the air is not heated within the flask the work done in expelling the air causes that which remains to gradually grow colder, so that at the end of the run its temperature is frequently below zero; in practice it is found that with a final pressure of 300 pounds at the gage, if the flask stands long enough to reabsorb the heat lost during the run, the air pressure rises to about 500 pounds. Under these conditions of the original weight of air, only 148¾ pounds have been utilized. If on the other hand the air is heated within the flask its final chilling is avoided, and sufficient heat can be imparted to it to expel considerably more air than if the temperature in the flask remained unchanged; in practice it is found that by heating the air to nearly 600 degrees Fahrenheit, if the pressure at the end of the run is 300 pounds, then after cooling to the normal it falls to about 200 pounds, leaving only say 17 pounds weight of air in the flask, so that 174 pounds of air have been used to produce useful work, as against 148¾ pounds in the case where the air was not heated in the flask.

By my invention in order to combine the advantages of both systems I provide an outside heater located beyond the reducing valve, combined with means for heating the air in the flask toward the end of the run. The function of the latter heating means is not primarily to directly increase the efficiency of the air, as this is performed by the outside heater; but is to expel the maximum weight of air from the flask and thereby deliver as much of the stored-up energy as possible for effective utilization. The heater within the flask might operate from beginning to end of the run, but as its function is not required during the early part of the run I prefer to confine its operation to the latter portion of the run. Preferably I provide for starting the combustion in this heater when the pressure in the flask has fallen to about 500 or 600 pounds.

The accompanying drawings show a suitable and preferred embodiment of my invention.

Figure 2:
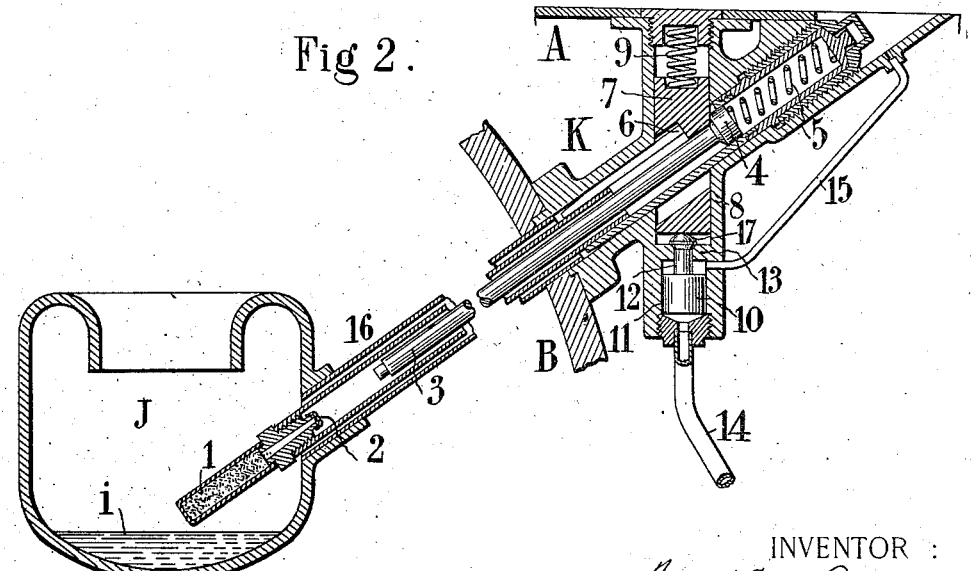

Figure 1 is a vertical longitudinal section of an intermediate portion of a torpedo, showing part of the air reservoir, the engine, and the intermediate parts. Fig. 2 is a vertical mid-section on a larger scale, showing the heater within the reservoir and the igniter therefor.

Referring to the drawings, let A designate the shell or hull of the torpedo, B the compressed air reservoir or air flask, C the engine or motor, here shown as a turbine, D the propeller shaft, E the air heater or combustion chamber (familiarly called the "superheater"), and F the fuel-pot or vessel in which the liquid combustible is stored. Compressed air passes from the reservoir to the engine by means of a pipe $a$ controlled by a starting valve G and leading thence to a reducing valve H from which the air at reduced pressure passes through a pipe $b$ to the heater E, and thence by a pipe $c$ to the inlet or nozzle of the engine or turbine. In order to feed the alcohol or other liquid fuel from the vessel F into the heater E, a branch pipe $d$ is arranged to take air from the pipe $b$ and lead it into the top of the vessel, while from the bottom of the vessel a fuel pipe $e$ leads to the fuel nozzle or atomizer $f$. A choke-valve $g$ may be provided to insure that the air pressure at $d$ shall be sufficiently in excess of that in E to cause a flow of the liquid fuel. Any suitable igniter $h$ is provided to start the combustion in the heater E.

The parts thus described are already known, and form no novel part of the present invention.

According to this invention a supplemental heater J is provided within the reservoir B, and a secondary igniter K is arranged to start the combustion in this heater at a suitable time, preferably toward the end of the run. The heater J and igniter K may be variously constructed. A suitable construction is that shown, which is similar to that set forth in my United States Patent No. 693,872, granted February 25, 1902. The heater J is best made as a receptacle sufficiently open at the top, and which can be charged with a sufficient quantity of liquid fuel, as shown at $i$. The igniter K is or may be of precisely the construction set forth in my aforesaid patent, except that its proportions are so modified that its action is delayed, so that instead of operating immediately after the starting of the engine it does not operate until toward the latter part of the run. In the construction shown a slow-burning cartridge 1 having a percussion cap 2 is ignited by the striking of this cap by a firing-pin 3, which pin has a head 4 and is pressed down by a strong spring 5. At starting, it is held back by a projection 6 engaging the head 4, which projection is formed on a plunger 7 which may freely slide in a cylindrical chamber formed in a shell 8. The plunger is pressed down by a spring 9, and is lifted to release the firing-pin by the movement of a plunger 10 which slides freely in a cylindrical chamber 11 and has a stem 12 passing up through a partition 13 into contact with the bottom of the plunger 7. The cylindrical chamber 11 communicates beneath the plunger 10 by a pipe 14 with the compressed air on the outlet side of the reducing valve H and preferably with the pipe $c$ at or near the nozzle or inlet of the engine, as shown. The upper side of the chamber 11 communicates by a pipe 15 with the outer air. The shell 8 communicates through a tube 16 or otherwise with the compressed air in the reservoir B, and by reason of the loose fit of the plunger 7 this air pressure reaches the head 17 of the stem 12, which head forms a valve which is ground to a seat in the partition 13. Consequently the high air pressure in the reservoir presses downwardly upon the valve 17, while the reduced air pressure which reaches the engine presses upwardly beneath the plunger 10; so long as the reservoir pressure remains high enough to hold down the plunger against the uniform pressure tending to lift it, the igniter remains passive; but when the reservoir pressure falls to a predetermined point (determined by the relative areas of the valve 17 and plunger 10) the downward pressure on the valve 17 becomes insufficient to resist the upward pressure on the plunger 10, and the latter consequently is forced up, so that it lifts the plunger 7, withdraws the projection 6, and releases the firing-pin, which is thrown downward by its spring and explodes the cartridge, thereby igniting the combustible in the heater J. For example, with a pressure of 300 pounds in the pipe 14, if it be desired that the igniter shall act when the pressure in the reservoir falls to 600 pounds, it is only necessary to make the valve 17 of an area one-half that of the plunger 10. Sufficient liquid fuel is placed in the heater J so that when ignited toward the end of the run it will continue to burn until at or about the termination of the run.

While the construction described is believed to be the most simple, yet it is apparent that it may be greatly modified without departing from the present invention. For example, the secondary igniter K may be greatly changed. This igniter may be operated from the engine in such manner as to insure its operation at the proper time; for example, it may be thus operated by the means set forth in my application for United States patent filed February 16, 1907, Serial No. 357,629. It is preferable but not essential that the heater J be operated only toward the end of the run; instead of this its ignition might be effected in the early part of the run, but in such case it is preferable that the combustion should be maintained at a slow rate during the early portion of the run, and be augmented toward the latter portion.

I claim as my invention:—

1. In an automobile torpedo, a compressed air reservoir, an engine, an intervening reducing valve, and means beyond said valve for heating the air under reduced pressure in its passage from the reservoir to the engine, combined with means for heating the air in the reservoir during the latter portion of the run whereby to expel a greater portion of the residual air.

2. In an automobile torpedo, a compressed air reservoir, an engine, an intervening reducing valve, and means beyond said valve for heating the air under reduced pressure in its passage from the reservoir to the engine, combined with a heater in the reservoir and means controlling it to heat the air in the reservoir during the latter portion only of the run to expel a greater portion of the residual air.

3. In an automobile torpedo, a compressed air reservoir, an engine, and means for heating the air in its passage from the reservoir to the engine, combined with a heater in the reservoir, and an igniter therefor adapted to operate toward the latter part of the run whereby to heat and expel a greater portion of the residual air.

4. In an automobile torpedo, a compressed air reservoir, an engine, an intervening reducing valve, and means for heating the air in its passage from said valve to the engine, combined with a heater in the reservoir, and an igniter therefor adapted to operate when the pressure in the reservoir falls to a predetermined ratio to the pressure beyond the reducing valve.

5. In an automobile torpedo, a compressed air reservoir, an engine, an intervening reducing valve, a heater between said valve and the engine, adapted to operate throughout the run, and a heater in the reservoir adapted to heat the air during the latter portion of the run.

6. In an automobile torpedo, a compressed air reservoir, an engine, an intervening reducing valve, a heater between said valve and the engine having an igniter and fuel-feeding means adapted to maintain combustion throughout the run, combined with a heater in the reservoir and an igniter therefor operating toward the latter part of the run whereby to heat and expel a greater portion of the residual air.

7. In an automobile torpedo, a compressed air reservoir, an engine, an intervening reducing valve, a heater between said valve and the engine, and an independent heater within the reservoir.

In witness whereof, I have hereunto signed my name in the presence of two subscribing witnesses.

FRANK M. LEAVITT.

Witnesses:
B. W. STONE,
J. B. McCANN.